Inventor
Jay P. Walker

Nov. 28, 1939.  J. P. WALKER  2,181,686

APPARATUS FOR TREATING OIL EMULSIONS

Filed Dec. 17, 1937  3 Sheets—Sheet 2

Inventor
Jay P. Walker

By Jack A. Ehley

Attorney

Inventor
Jay P. Walker

Patented Nov. 28, 1939

2,181,686

UNITED STATES PATENT OFFICE 2,181,686

APPARATUS FOR TREATING OIL EMULSIONS

Jay P. Walker, Tulsa, Okla., assignor of forty per cent to Guy O. Marchant and six per cent to C. G. Wells, both of Tulsa, Okla.

Application December 17, 1937, Serial No. 180,458

1 Claim. (Cl. 196—5)

This invention relates to new and useful improvements in apparatuses for treating oil, gas and water.

This application is filed as a continuation in part of my co-pending application filed September 12, 1936, Serial No. 100,576, which was filed as a division of a former application filed March 29, 1935, Serial No. 13,675.

The invention has particularly to do with heat exchange between liquids and fluids of oil, gas and water mixtures under treatment for the extraction of water and the separation of gas, whereby one of the components is heated and another of the components is cooled.

One object of the invention is to provide an improved device particularly adapted for preheating an influent containing water either before or after the separation of gas from an emulsion or an emulsified oil, gas and water mixture.

A further object of the invention is to provide a preheater in the form of a heat exchanger wherein comparatively hot and cold components are conducted either concurrently or countercurrently through contiguous, but separate passages, and in such close proximity as to promote heat exchange by the contact of one flowing component with the conductor of the other flowing component.

Still another object of the invention is to provide a preheater utilizing the hot oil to preheat an influent and to cool said oil, wherein one of the components is conducted through numerous small tubes to provide amplified heat exchanging surfaces, together with means for remixing gas and gaseous fluids with the hot oil in the preheater, as well as for carrying off gas from said preheater.

Another object of the invention is to provide a preheater which by its construction lends itself readily adaptable for mounting on the side of a single upright treating tank, wherein the complete treating operation is performed; as well as for disposition in any other desirable position.

A construction designed to carry out the invention will be hereinafter described, together with other features of the invention.

Figures 1, 2:
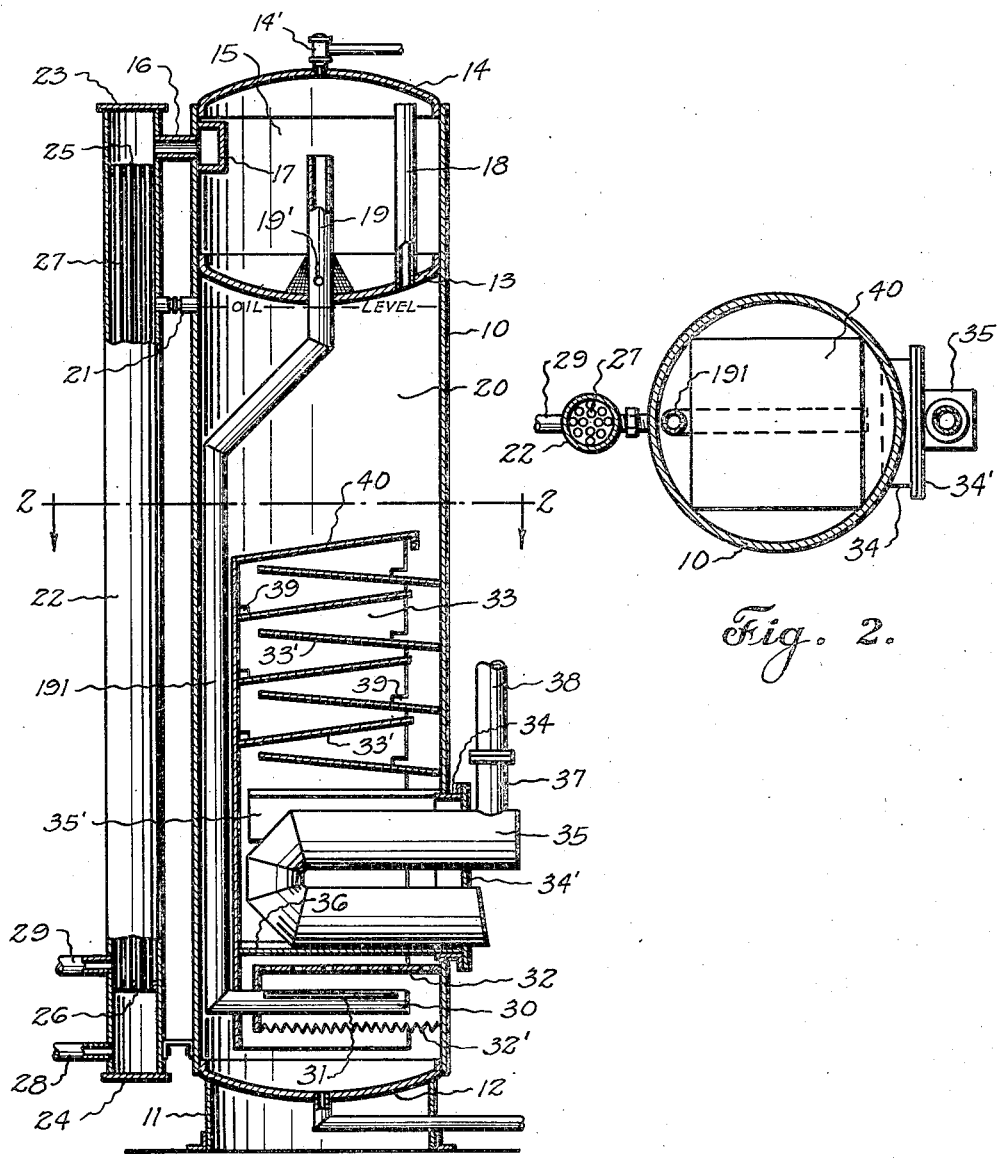
Figure 3:
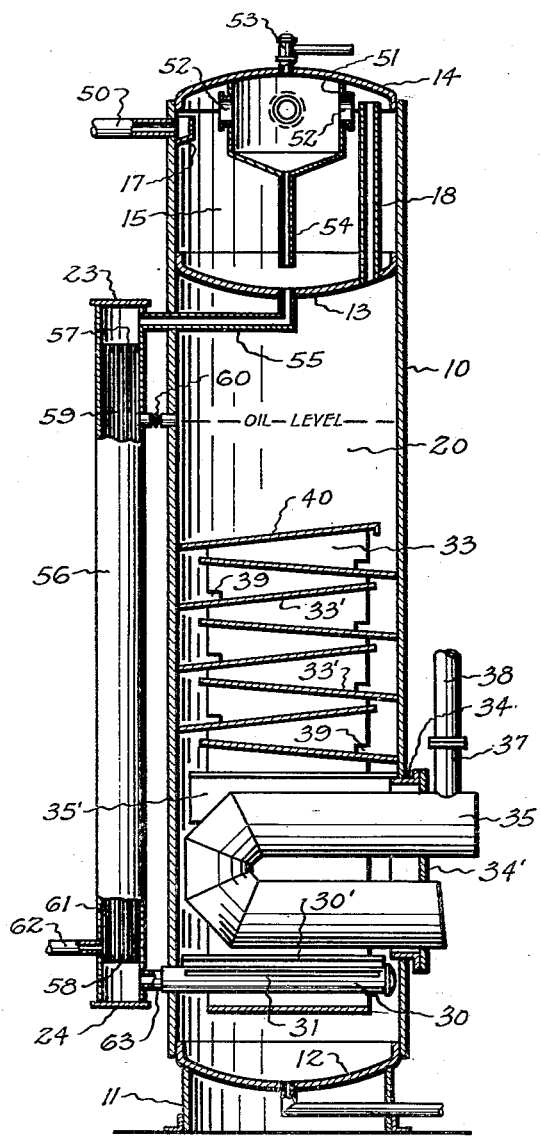
Figure 4:
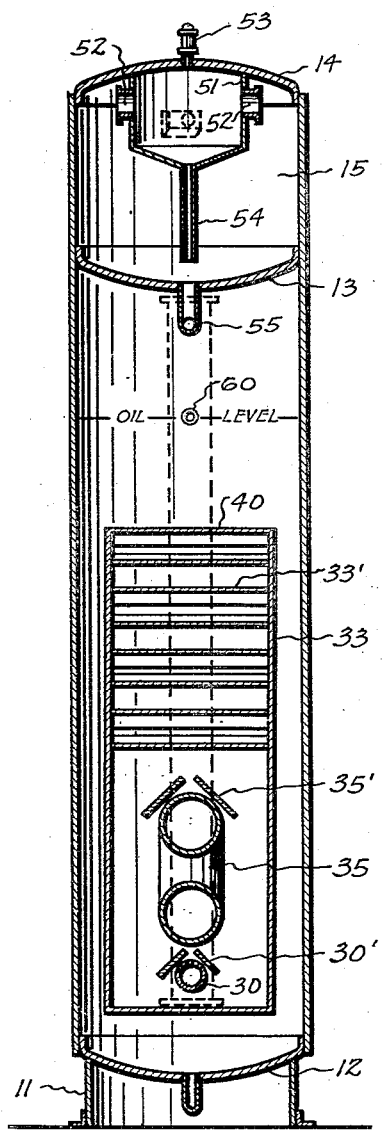
Figure 5:
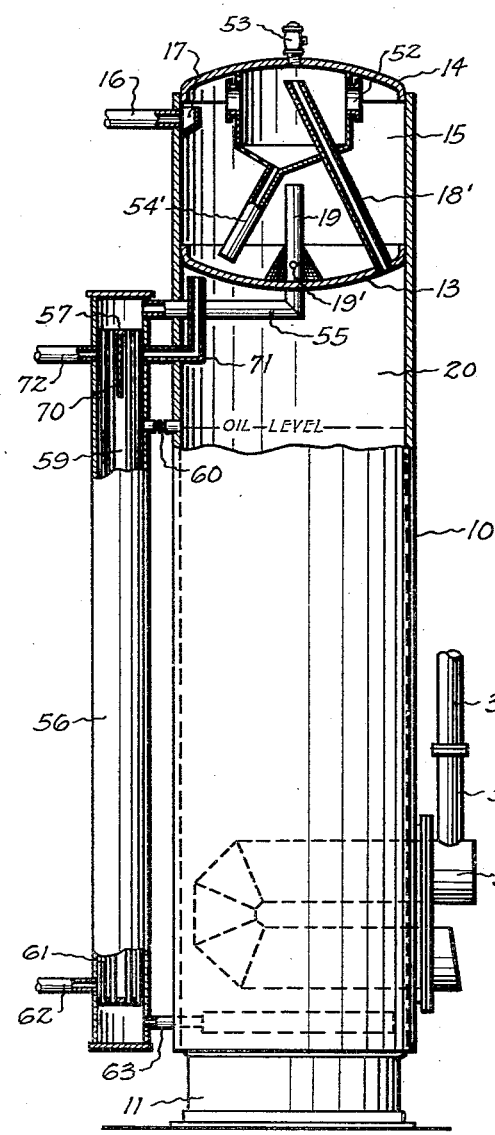
Figure 6:
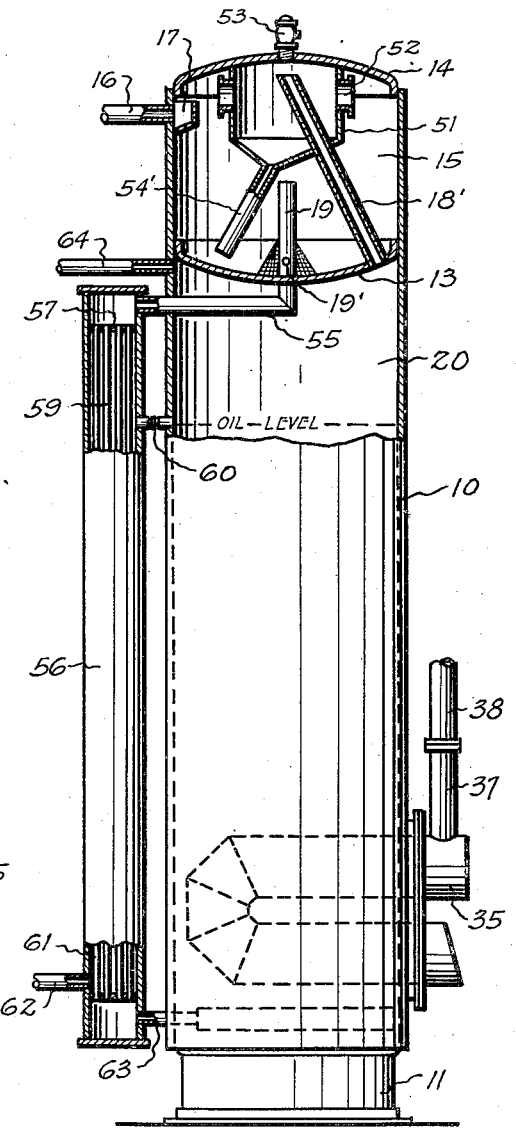

The invention will be more readily understood from a reading of the following specification and by reference to the accompanying drawings, in which an example of the invention is shown, and wherein:

Figure 1 is a vertical, sectional view of a treating apparatus constructed in accordance with the invention, Figure 2 is a horizontal, cross-sectional view taken on the line 2—2 of Figure 1, Figure 3 is a vertical, sectional view of another form in which the invention may be carried out, Figure 4 is a similar view at right angles to Figure 3, Figure 5 is a vertical, sectional view of still another structure typical of the invention, and Figure 6 is a similar view to Figure 5 showing another form.

In the drawings, the numeral 10 designates an upright cylindrical tank of usual construction, such as is used in the building of oil, gas and water separators. The tank is provided with a suitable base 11 and a false bottom 12. A dished head 13 is secured within the tank near the upper end thereof, while the extreme upper end of said tank is closed by a crowned cap or top 14. The members 13 and 14 seal off the upper portion of the tank, and as is obvious by observing Figure 1, are spaced from each other so as to form a receiving or separating chamber 15 therebetween. An inlet pipe 16 extends through the wall of the chamber 15 and discharges into a diverter box 17, whereby the influent is caused to take a circumferential course around the inner wall of said chamber. The influent is scrubbed on the wall of the chamber 15, while the gaseous fluids which are separated rise therein.

A suitable gas outlet pipe 14' may be connected in said top 14 and provided with the customary control valve (not shown). A vertical gas equalizing pipe 18 is mounted in the head 13 and extends upwardly within the chamber 15. This pipe is located at one side of the head, having its upper end terminating just below the top 14, whereby communication is established between the chamber 15 and the upper portion of the tank 10 below the head 13. This communication between the chamber and tank permits hot gases from the oil in the tank to rise into said chamber to contact the cool influent, whereby such hot gases are condensed and dropped back into the oil. The pipe also affords equalization of gas pressures between the chamber and the tank. Thus, the chamber may act as a receiving, separating and gas mixing chamber. The hot gases also contact the cold bottom of the chamber and are condensed, whereby the higher volatiles are recovered.

The liquids which have been primarily separated from the major portion of the gas, but which may contain some gas in solution, flow from the chamber 15 through an overflow pipe 19, which has an inlet orifice 19' near its bottom. A flow pipe 191 conducts the liquids from the pipe 19 to the bottom of the treating chamber 20 which is formed between the false bottom 12 and the head 13. Within the treating chamber 20, the liquids are suitably heated and the water precipitated therefrom, as will be hereinafter explained. After such heating and water precipitation, the separated oil escapes from the chamber 20 through an outlet pipe 21 which is located in the wall of the tank at a point below the dished head 13.

It is desirable to reduce the amount of chemical used in dehydrating the influent and if possible, to do away with its use altogether. Such a result may be accomplished to a great extent by preheating the influent as it comes from the well and is about to enter the chamber 15. A preheater and cooler, or heat exchanger 22 is mounted vertically of the tank 10 at one side thereof, and said heat exchanger extends substantially throughout the vertical length of the tank. The heat exchanger has a cylindrical shape and is closed at its upper end by a cap 23 and at its lower end by a cap 24. A head 25 is spaced a short distance below the cap 23, while a head 26 is spaced from the bottom cap 24 (Figure 1). The heads 25 and 26 are connected by a plurality of vertical tubes 27, which tubes have their ends open to the spaces between the heads and the caps. An influent pipe 28 which leads from the well, connects with the space between the lower cap 24 and the head 26, whereby the influent from the well is introduced into the open lower ends of the vertical tubes 27 so as to pass upwardly through said tube into the space between the upper head 25 and the top cap 23. The influent pipe 16 which leads into the chamber 15 at the upper end of the tank 10 is connected with this space, whereby the influent after passing through the vertical tubes 27 will flow into the chamber 15. It is noted that the incoming liquids from the well are comparatively cool.

The outlet pipe 21 which leads from the treating chamber 20 is connected to the preheater and cooler 22 below the upper head 25, whereby the oil is discharged into the space around the vertical tubes 27. This oil passes downwardly through the exchanger 22 and discharges through a pipe 29 which is located in the wall of said heat exchanger at a point just above the lower head 26. The oil being discharged through the outlet pipe 21 from the treating chamber 20 has been heated, as will be hereinafter explained, and since this hot oil flows downwardly around the vertical tubes 27, and the comparatively cool influent from the pipe 28 is passing upwardly through said tubes, it will be obvious that a heat exchange will be had, whereby the cool influent is heated and the hot oil is cooled.

The preheating of the influent reduces the amount of chemical necessary to be introduced into the pipe 28, and in some instances the use of the emulsion treating chemicals is entirely eliminated. The influent is gradually heated as it flows upwardly through the tubes 27 and when it reaches the chamber 15, the preliminary separation of the gas is greatly enhanced. Also the preheating of the influent reduces the amount of heat necessary in the chamber 20 to carry out the complete separation of the oil. By releasing as much as possible of the gas in the chamber 15 under the lowest possible pressure before passing the emulsion to the heating zone, and also by reducing the heat within the chamber 20, much better results are obtained and the loss of the more valuable volatile constitutents is prevented. Also much better water precipitation within the chamber 20 is obtained.

Since the influent is introduced into the chamber 15 at the upper end of the tank 10, the introduction of the well influent into the preheater and cooler 22 at the lower end of said preheater and cooler is an important feature of the invention. By introducing the well flow into the lower end of the preheater, it is obvious that said influent may pass upwardly through the vertical tubes in a continuous flow to the upper end of the tank and also, due to the length of said preheater and cooler, the influent is thoroughly preheated by the time it reaches the upper head 25 at the upper end of the vertical tubes 27. If the influent were introduced into the upper end of the heat exchanger, it will be seen that said influent would have to pass downwardly through the preheater and then upwardly therethrough so as to be introduced into the upper end of the tank 10. It is further pointed out that by introducing the influent into the space between the lower head 26 and the cap 24 and then forcing said influent upwardly through the small vertical tubes 27, a choking effect on the influent is produced. This permits the gas which is naturally present in the well influent to cause an agitation which will thoroughly admix with the influent the treating chemicals which have been introduced into the pipe 28.

From the above, it will be seen that the well influent is introduced into the lower end of the preheater and cooler 22, it then passes upwardly through this heat exchanger and finally introduced into the chamber 15 at the upper end of the tank 10. In the chamber 15, as has been explained, a preliminary separation of gas is accomplished.

The liquids which have been primarily separated from the gas in the chamber 15, but which contain some gas in solution flow from the chamber downwardly through the pipes 19 and 191. The pipe 191 extends from the bottom of the head 13 and is off-set so as to extend downwardly in close proximity to the wall of the tank. At its lower end the pipe 191 is connected to one end of a horizontal nozzle 30 which extends diametrically across the tank, as is best shown in Figure 1. The nozzle has one or more elongate slots 31 therein and these slots may be located wherever desired. The mixture or emulsion composed of oil and water and substantially free from gas, is discharged from the nozzle into a receiving hood 32, which has a general rectangular shape. The hood extends from the wall of the tank inwardly so as to overhang the nozzle, and the flat top of the hood is preferably provided with perforations while the lower edges of its vertical walls are formed with saw-teeth 32'.

The emulsion which is discharged into the hood from the nozzle will have a tendency to rise but it cannot escape except through the perforations in the hood or downwardly and around the saw-teeth edges 32'. The hood 32 acts as a spreader and causes the emulsion to flow more or less horizontally or laterally from the nozzle. Because of the degasification in the chamber 15 the emulsion discharged from the nozzle will flow more or less unagitated.

An upright housing 33 which is closed on three vertical sides and which has its bottom open is disposed in the lower part of the tank. The vertical edges along the open sides of the housing are attached to the inner wall of the tank 10, as shown in Figure 1. The hood 32 is contained within the lower portion of the housing a substantial distance above the open bottom thereof. The housing is provided with transverse inclined baffles 33' which are located in staggered relation and the arrangement or mounting of the housing 33 within the tank is the same as the thermo-syphon treating unit which is fully shown and described in my co-pending application, filed September 12, 1936, Serial No. 100,577.

The tank 10 is provided with a manhole 34 which is located just above the hood 32 and a U-shaped tubular fire box 35 is mounted in the cover 34' of the manhole. The fire box extends into and across the tank within the housing 33 and it will be seen that by removing the manhole cover 34' the fire box may be bodily removed from the tank. This is a desirable feature for it readily permits the fire box to be removed from or inserted in the tank with little or no trouble. The lower leg of the box is supported upon an angle bar 36 extending from the manhole to the opposite wall of the housing. This lower leg of the box is open and receives a suitable burner or heater (not shown), while the upper leg of said fire box is closed and carries a nipple 37 extending upwardly from the projecting end to which a suitable stack 38 may be attached. It is specifically noted that the invention is not to be limited to any particular kind of heat or heating element as any suitable means for heating may be employed, either internally or externally of the tank 20.

The action or operation of the treating unit located in the treating chamber 20 is exactly the same as that of the treating unit disclosed in my co-pending application hereinbefore referred to. The upwardly flowing emulsion passing through the zone of the fire box 35 in the housing 33 will be kept in heating contact therewith by inclined baffles 35' which overhang each leg thereof. The emulsion will be properly heated and will then encounter the transverse inclined baffles 33', and as the emulsion passes upwardly through the housing the water will be precipitated therefrom. Apertures or openings 39 are provided in the vertical side wall of the housing just above each baffle and nearer the lower end thereof. These openings permit water which is separated from the emulsion to run down the upper side of the baffle and escape from the housing. By the time the emulsion reaches the upper end of the housing and escapes into the tank from beneath the inclined top 40 of said housing, substantially all of the water will be separated therefrom and the upwardly flowing stream will be practically all oil with some gas in solution. This hot oil escaping through the outlet pipe 21 and circulating around the vertical tubes 27 flows downwardly and finally is discharged to the outlet pipe 29 which is located in the heat exchanger 22 just above the lower head 26. The comparatively cool influent flowing upwardly through the tubes 27 at the same time that the hot oil is flowing downwardly around said tube will set up a heat exchange whereby the incoming cool influent will be heated, while the hot oil flowing from the chamber 20 within the tank 10 will be cooled. The hot gaseous fluids rising from the hot oil in the tank contact the cool bottom of the surge chamber and condense, falling back into the oil to raise the gravity thereof.

In Figures 3 and 4, I have shown another structure for carrying out the invention. In this form the influent from the well or other source is introduced into the chamber 15, without preheating, through an inlet pipe 50 into the diverter box 17, similar to Figure 1. A gas separating shell 51 depends from the top 14 and has inlet louvres 52. The gas which is scrubbed out (in the usual manner) escapes by way of the pipe 53, which may include the ordinary gas pressure regulating valve (not shown). Liquids which are recovered in the shell drain through the pipe 54 into the bottom of the chamber 15. The gas equalizing pipe 18, also extends through the bottom 13 into the chamber.

A flow pipe 55 conducts the liquids from the bottom 13 of the chamber 15 through the upper portion of the chamber 20 and out through the side wall thereof to the upper end of a preheater or heat exchanger 56. The preheater has an upper head 57 below the pipe 55 and a lower head 58 above its bottom. The space confined between the heads constitutes an oil chamber 59 which is connected with the tank, at the oil level thereof, by a pipe 60.

A plurality of tubes 61 similar to the tubes 27 extend from one head to the other and have their ends open to the spaces above and below said heads. The liquids flowing through the pipe 55 enters the preheater and flows down through the tubes to the space below the head 58. The hot oil entering the space 59 from the pipe 60 flows down the outsides of the tubes 61 and escapes through a pipe 62 at the bottom of the space 59. The heat exchange which takes place cools the oil and heats the flowing liquids. The flowing liquids or influent is conducted from the lower end of the preheater by a pipe 63 to the nozzle and the apparatus and operation from there on is the same as has been described, with the exception that a pair of inclined baffles 30' are mounted above the nozzle 30 to direct the influent flowing upwardly from the slots 31 in said nozzle into contact with the bottom of the lower leg of the fire box 35.

Other forms typical of the invention are shown in Figures 5 and 6 and these are similar to Figures 3 and 4. Instead of the pipe 18, a similar pipe 18' extends from the head 13 into the shell 51, for equalizing the gas pressure and a drain pipe 54' is employed. The drain pipe is inclined because the overflow pipe 19 is used in these forms.

The preheater in Figure 6 is substantially the same as in Figures 3 and 4. The chamber 20 in Figure 6 is provided with a gas escape pipe 64 which extends from the highest point, just under the head 13, so that the gaseous fluids may be scrubbed against the bottom of the head 13, before escaping. While the preheater in Figure 5 uses the same parts as in Figures 3, 4, and 6, there is added a gas baffle 70 which depends from the head 57 into space 59 above the oil level established by the pipe 60. An angular pipe 71 extends from the gas space below the head 13 through the tank wall and into the space 59 just below the head 57. A gas escape pipe 72 extends from the space 59 on the opposite side of the baffle. Gaseous fluids, usually rich in high volatile oils, are baffled through the upper end of the space 59. The liquids which are thus precipitated by condensation are dropped and remixed with the hot oil, thus enriching the same.

While the preheater 22 has been shown as mounted uprightly and on the side of the tank, it is to be understood that it may be placed at any suitable point and in such positions at which it will operate satisfactorily.

This application is directed to the combination of the particular type of preheater, whereby the influent emulsion is divided into a plurality of small streams so as to be more thoroughly heated and thereby release the gas which it is necessary to separate in order to carry out the method disclosed in my copending application, Serial No. 100,655 filed Sept. 14, 1936. The washing in the tank is dependent upon the dividing of the influent into small streams in the preheater so that the preheating will be sufficient to provide adequate emulsion breaking in the tank. The preheater is shown in said copending application, but is not claimed therein.

What I claim and desire to secure by Letters Patent, is:

In an emulsion treating apparatus, the combination of an upright tank having a transverse partition across its upper portion dividing said tank into a separating chamber above said partition and an oil washing portion below said partition, an elongate preheater mounted vertically on the outer side of said tank and having transverse heads adjacent its ends constituting an oil flow space therebetween, an oil outlet extending from the preheater and oil space above the lower head, tubes extending from one head to the other head, a conductor extending from the upper end of the preheater to the separating chamber of the tank, and a short oil outlet conductor extending from the tank below the partition to the upper portion of the oil space of the preheater.

JAY P. WALKER.